(12) United States Patent
Allen et al.

(10) Patent No.: US 7,911,471 B1
(45) Date of Patent: Mar. 22, 2011

(54) METHOD AND APPARATUS FOR LOOP AND BRANCH INSTRUCTIONS IN A PROGRAMMABLE GRAPHICS PIPELINE

(75) Inventors: Roger L. Allen, San Jose, CA (US); Harold Robert Feldman Zatz, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1271 days.

(21) Appl. No.: 10/962,042

(22) Filed: Oct. 8, 2004

Related U.S. Application Data

(63) Continuation of application No. 10/302,411, filed on Nov. 22, 2002, now Pat. No. 6,825,843.

(60) Provisional application No. 60/397,087, filed on Jul. 18, 2002.

(51) Int. Cl.
*G06T 15/00* (2006.01)
(52) U.S. Cl. .................................................. 345/522
(58) Field of Classification Search .................. 345/522
See application file for complete search history.

(56) References Cited

U.S. PATENT DOCUMENTS

| | | | | | |
|---|---|---|---|---|---|
| 5,375,238 | A * | 12/1994 | Ooi | ............................... | 712/241 |
| 5,852,443 | A * | 12/1998 | Kenworthy | ................... | 345/441 |
| 6,118,452 | A * | 9/2000 | Gannett | ........................ | 345/418 |
| 6,236,413 | B1 * | 5/2001 | Gossett et al. | ................ | 345/506 |
| 6,252,610 | B1 * | 6/2001 | Hussain | ........................ | 345/506 |
| 6,259,461 | B1 * | 7/2001 | Brown | .......................... | 345/556 |
| 6,476,808 | B1 * | 11/2002 | Kuo et al. | ..................... | 345/422 |
| 6,483,505 | B1 * | 11/2002 | Morein et al. | ................ | 345/419 |
| 6,578,197 | B1 * | 6/2003 | Peercy et al. | ................. | 717/143 |
| 6,633,297 | B2 * | 10/2003 | McCormack et al. | ........ | 345/506 |
| 6,657,624 | B2 * | 12/2003 | Olano | .......................... | 345/426 |
| 6,801,203 | B1 * | 10/2004 | Hussain | ........................ | 345/506 |
| 6,847,370 | B2 * | 1/2005 | Baldwin et al. | ............... | 345/564 |
| 6,864,892 | B2 * | 3/2005 | Lavelle et al. | ................ | 345/503 |
| 6,867,781 | B1 * | 3/2005 | Van Hook et al. | ............ | 345/506 |
| 7,015,909 | B1 * | 3/2006 | Morgan, III et al. | .......... | 345/426 |
| 7,034,828 | B1 * | 4/2006 | Drebin et al. | ................ | 345/426 |
| 7,159,212 | B2 * | 1/2007 | Schenk et al. | ................ | 717/153 |
| 2003/0169259 | A1 * | 9/2003 | Lavelle et al. | ................ | 345/501 |

OTHER PUBLICATIONS

Eggers, et al. "Simultaneous Multithreading: A Platform for Next-Generation Processors," IEEE Micro, vol. 17, No. 5, pp. 12-19, Sep./Oct. 1997.

* cited by examiner

*Primary Examiner* — Daniel Washburn
(74) *Attorney, Agent, or Firm* — Patterson & Sheridan, LLP

(57) ABSTRACT

A method and apparatus for executing loop and branch program instructions in a programmable graphics shader. The programmable graphics shader converts a sequence of instructions comprising a portion of a shader program and selects a first set of fragments to be processed. Subsequent sequences of instructions are converted until all of the instructions comprising the shader program have been executed on the first set of fragments. Each remaining set of fragments is processed by the shader program until all of the fragments are processed in the same manner. Furthermore, the instructions can contain one or more loop or branch program instructions that are conditionally executed. Additionally, when instructions within a loop as defined by a loop instruction are being executed a current loop count is pipelined through the programmable graphics shader and used as an index to access graphics memory.

17 Claims, 5 Drawing Sheets

METHOD AND APPARATUS FOR LOOP AND BRANCH INSTRUCTIONS IN A PROGRAMMABLE GRAPHICS PIPELINE

CROSS-REFERENCE TO RELATED APPLICATIONS

This application is a continuation of, and claims priority benefit of, U.S. patent application Ser. No. 10/302,411 entitled "Method and Apparatus for Loop and Branch Instructions in a Programmable Graphics Pipeline," filed Nov. 22, 2002 now U.S. Pat. No. 6,825,843, having common inventors and assignee as this application. This application claims priority benefit of provisional U.S. patent application No. 60/397,087 entitled "Shader System and Method," filed Jul. 18, 2002, having common inventors and assignee as this application. The subject matter of the related patent applications is hereby incorporated herein by reference.

BACKGROUND OF THE INVENTION

1. Field of the Invention

The invention is in the field of computer graphics, and more particularly to processing program instructions in a multi-pass graphics pipeline.

2. Description of the Related Art

Current multi-pass data processing methods are exemplified by systems and methods developed for computer graphics. This specialized field includes technology wherein data is processed through a multi-pass pipeline in which each pass typically performs a specific sequence of operations on the data and uses the output of one pass during processing of a subsequent pass. At the end of a first pass the output data is written to memory (local or host). During a subsequent pass the output data from the first pass is read from memory and processed.

Recent advances in graphics processors permit users to program graphics pipeline units using microcoded programs called pixel or shader programs to implement a variety of user defined shading algorithms. Although these graphics processors are able to execute shader programs, the program instructions that the graphics processors are capable of executing do not include loop and branch instructions. As a result, shader programs that repeat instructions, e.g., loop on different sets of data, must include instructions for each loop explicitly. For example, a loop comprised of ten instructions, where the loop is executed five times becomes fifty program instructions without a loop instruction compared with eleven instructions (ten plus the loop instruction) with a loop instruction. Longer shader programs require more storage resources (host or local memory) and require more bandwidth to download from a host memory system to a local graphics memory.

For the foregoing reasons, there is a need for a graphics system that supports the execution of loop instructions.

SUMMARY OF THE INVENTION

The present invention is directed to a system and method that satisfies the need for supporting the execution of loop instructions. Providing support for the execution of loop instructions enables users to write more efficient shader programs requiring fewer lines of code to implement the same function and therefore less memory is needed to store the shader programs. The present invention also provides the ability to execute branch instructions.

Various embodiments of the invention include a programmable shader including an instruction processing unit. The instruction processing unit converts shader program instructions and outputs a converted sequence of program instructions based upon available resources in the programmable shader.

Various embodiments of the invention include a programmable shader including a fragment selector and an instruction processing unit. The fragment selector selects fragments, under control of the instruction processing unit, from a total number of fragments to produce a fragment set. The instruction processing unit combines the fragment set with a sequence of codewords to produce an output stream.

Some embodiments of the present invention include a method of executing a shader program including selecting a sequence of instructions from the shader program and converting the sequence of instructions and outputting a sequence of converted instructions based upon available resources in a programmable shader.

Some embodiments of the present invention include a method of executing a shader program including selecting a set of fragments from a total number of fragments, selecting a sequence of instructions from the shader program, and processing the set of fragments in a programmable shader by executing the sequence of instructions.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION

The current invention involves new systems and methods for processing graphics data in a programmable graphics shader. The present invention is directed to a system and method that satisfies the need for a programmable graphics shader that executes loop instructions. The system and method of the present invention also provides the ability to execute branch instructions.

Figure 1:
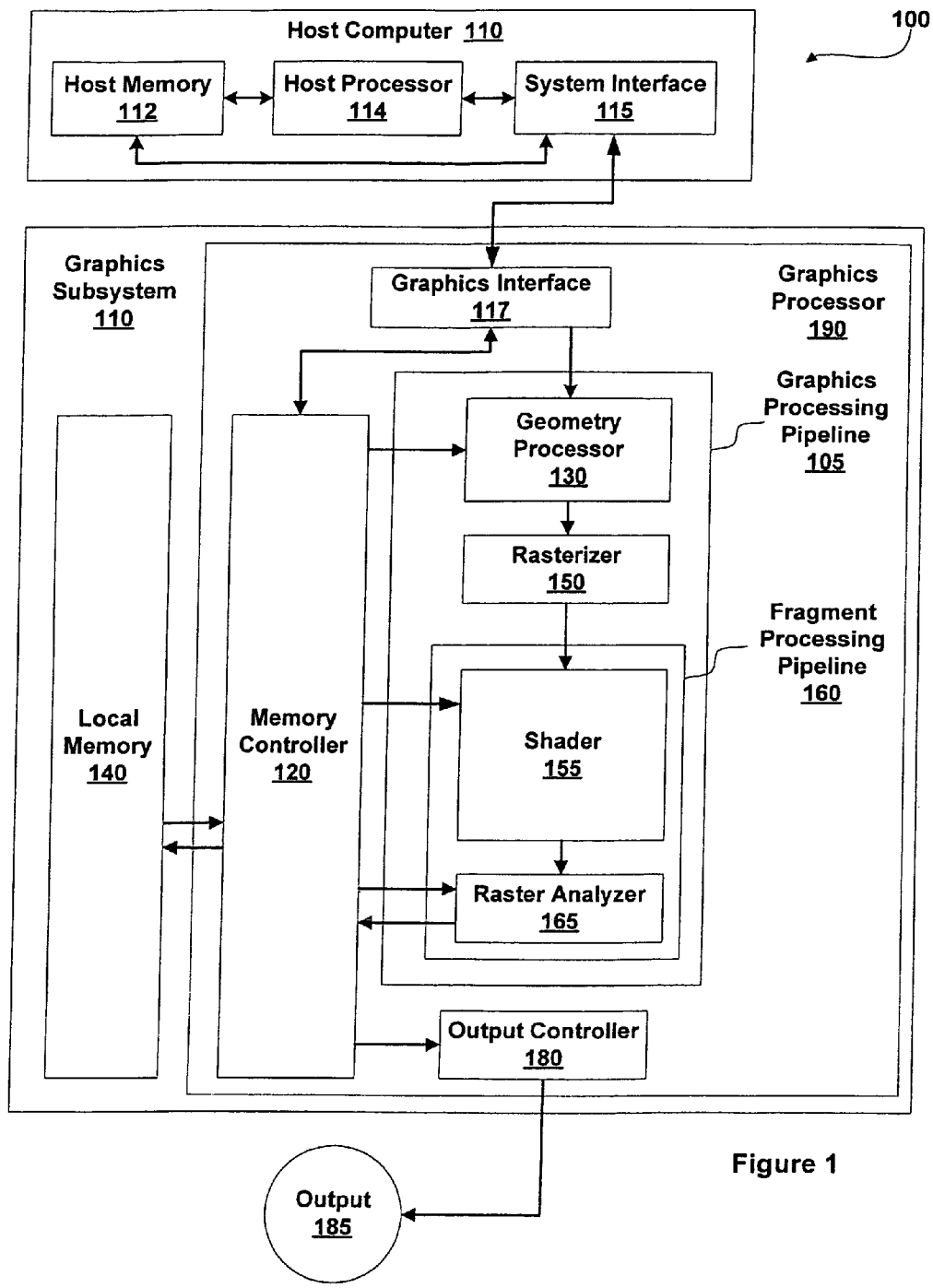
FIG. 1 illustrates one embodiment of a computing system according to the invention including a host computer and a graphics subsystem.

FIG. 1 is an illustration of a Computing System generally designated 100 and including a Host Computer 110 and a Graphics Subsystem 110. Computing System 100 may be a desktop computer, server, laptop computer, palm-sized computer, tablet computer, game console, cellular telephone, computer based simulator, or the like. Host computer 110 includes Host Processor 114 which may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112.

Host Computer 110 communicates with Graphics Subsystem 110 via System Interface 115 and a Graphics Interface 117. Data received at Graphics Interface 117 can be passed to a Geometry Processor 130 or written to a Local Memory 140 through Memory Controller 120. Memory Controller 120 is configured to handle data sizes from typically 8 to more than 128 bits. For example, in one embodiment, Memory Controller 120 is configured to receive data through Graphics Interface 117 from a 64-bit wide External Bus 115. The 32-bit data is internally interleaved to form 128 or 256-bit data types.

A Graphics Processing Pipeline 105 includes, among other components, Geometry Processor 130 and a Fragment Processing Pipeline 160 that each contain one or more programmable graphics processing units to perform a variety of specialized functions. Some of these functions are table lookup, scalar and vector addition, multiplication, division, coordinate-system mapping, calculation of vector normals, tessellation, calculation of derivatives, interpolation, and the like. Geometry Processor 130 and Fragment Processing Pipeline 160 are optionally configured such that data processing operations are performed in multiple passes through Graphics Processing Pipeline 105 or in multiple passes through Fragment Processing Pipeline 160.

Geometry Processor 130 receives a stream of program instructions and data and performs vector floating-point operations or other processing operations. Processed data is passed from Geometry Processor 130 to a Rasterizer 150. In a typical implementation Rasterizer 150 performs scan conversion and outputs fragment, pixel, or sample data and program instructions to Fragment Processing Pipeline 160. Alternatively, Rasterizer 150 resamples input vertex data and outputs additional vertices. Therefore Fragment Processing Pipeline 160 is programmed to operate on fragment, pixel, sample or any other data. For simplicity, the remainder of this description will use the term fragments to refer to pixels, samples and/or fragments.

Just as Geometry Processor 130 and Fragment Processing Pipeline 160 are optionally configured such that data processing operations are performed in multiple passes, a Shader 155, within Fragment Processing Pipeline 160, is optionally configured using shader programs such that data processing operations are performed in multiple passes through a recirculating pipeline within Shader 155. Shader programs are composed of program instructions compiled for execution within Fragment Processing Pipeline 160.

Data processed by Shader 155 is passed to a Raster Analyzer 165, which performs near and far plane clipping and raster operations, such as stencil, z test, etc., and saves the results in Local Memory 140. Raster Analyzer 165 includes a read interface and a write interface to Memory Controller 120 through which Raster Analyzer 165 accesses data stored in Local Memory 140. Traditionally, the precision of the fragment data written to memory is limited to the color display resolution (24 bits) and depth (16, 24, or 32 bits). Because Graphics Processing Pipeline 4105 is designed to process and output high resolution data, the precision of data generated by Graphics Processing Pipeline 105 need not be limited prior to storage in Local Memory 140. For example, in various embodiments the output of Raster Analyzer 165 is 32, 64, 128-bit or higher precision, fixed or floating-point data. These data are written from Raster Analyzer 165 through Memory Controller 120 to Local Memory 140 either through multiple write operations or through an Internal Bus 170.

When processing is completed, an Output 185 of Graphics Subsystem 110 is provided using an Output Controller 180. Output Controller 180 is optionally configured to deliver data to a display device, network, electronic control system, other Computing System 100, other Graphics Subsystem 110, or the like.

Figure 2:
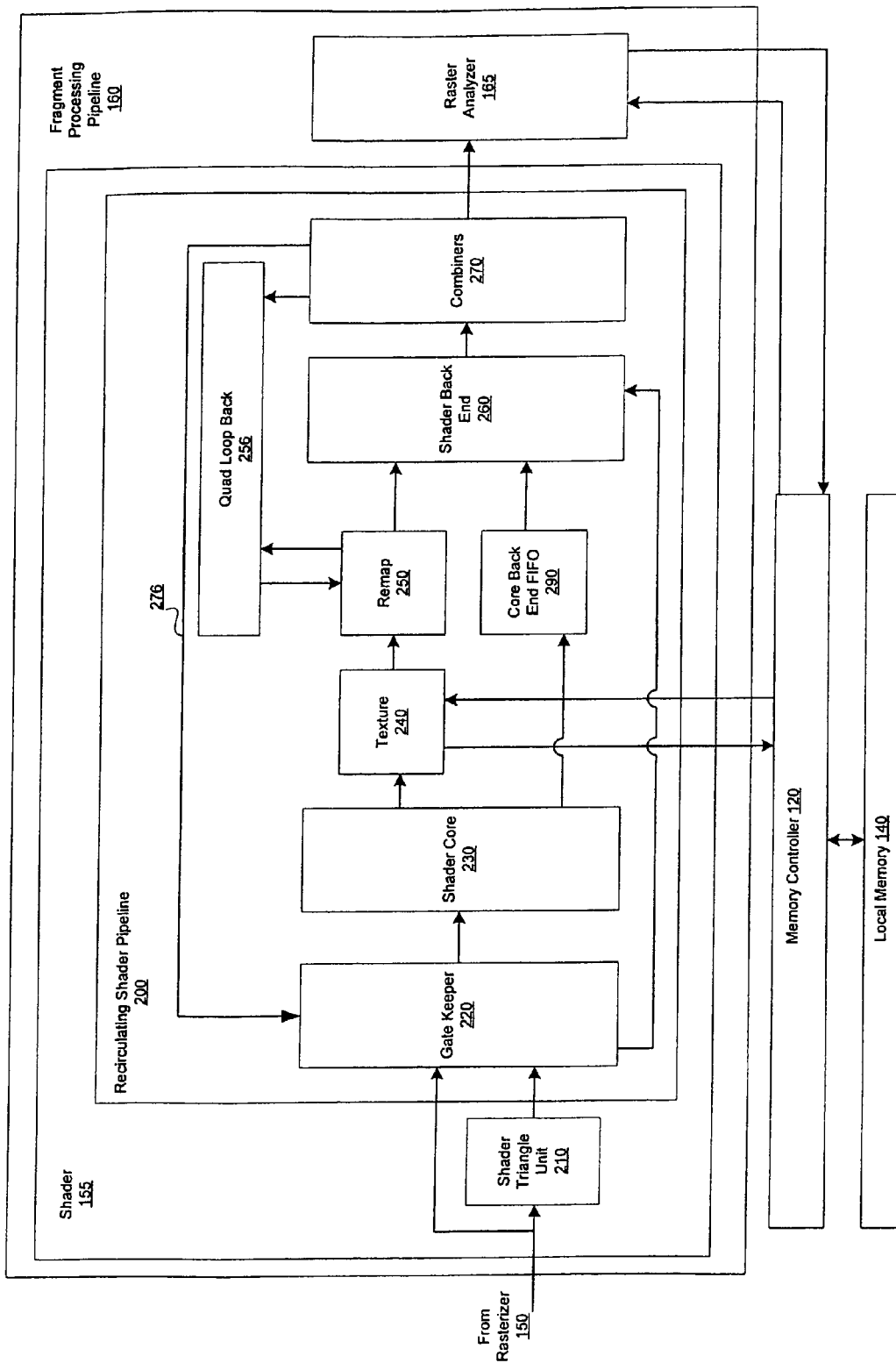
FIG. 2 is a block diagram of an embodiment of the Shader of FIG. 1.

FIG. 2 is a block diagram of Fragment Processing Pipeline 160 including Shader 155 and Raster Analyzer 165. Shader 155 and Raster Analyzer 165 process fragments that include fragment data such as color, depth, texture coordinates, other parameters, and the like, using program instructions compiled from user defined shader programs. The program instructions and fragment data are stored in memory, e.g., any combination of Local Memory 140 and Host Memory 112. Within Shader 155 program instructions are converted into codewords that control the processing to be done by the units in Fragment Processing Pipeline 160.

Shader 255 is comprised of a number of different units. A Shader Triangle Unit 210 calculates plane equations for texture coordinates, depth, and other parameters. A Gate Keeper 220, a Shader Core 230, a Texture 240, a Remap 250, a Shader Back End 260, and a Combiners 270 are each graphics processing units that are connected to form a Recirculating Shader Pipeline 200. Of these graphics processing units, Shader Core 230, Shader Back End 260, and Combiners 270, each includes a plurality of programmable computation units which are configured using codewords to perform arithmetic operations such as dot products, interpolation, multiplication, division, and the like. A Core Back End FIFO (first in first out) 290 and a Quad Loop Back 256 are storage resources, e.g., register file, FIFO, or memory, included in Recirculating Shader Pipeline 200. Gate Keeper 220 performs a multiplexing function, selecting between the pipeline data from Rasterizer 150 and Shader Triangle Unit 210 and a Feedback Output 376 of Combiners 270. Shader Core 230 initiates Local Memory 140 read requests that are processed by Memory Controller 120 to read map data (height field, bump, texture, etc.) and program instructions. Shader Core 230 also performs floating point computations such as triangle parameter interpolation and reciprocals. Fragment data processed by Shader Core 230 is optionally input to a Core Back End FIFO 290.

The read map data or program instructions, read by Shader Core 230 via Memory Controller 120, are returned to Texture 240. Texture 240 unpacks and processes the read map data that is then output to Remap 250 along with the program instructions. Remap 250 converts a program instruction into one or more codewords which control the processing to be done by the graphics processing units in Fragment Processing Pipeline 160, as explained more fully herein. For instance, a multiply codeword can configure a fixed-point computation unit in Combiners 270 to multiply two numbers.

When multi-pass operations are being performed within Shader 155, Remap 250 also reads the data fed back from Combiners 270 via Quad Loop Back 256, synchronizing the fed back data with the processed map data and program instructions received from Texture 240. Remap 250 formats the processed map data and fed back data, outputting codewords and formatted data to Shader Back End 260. Shader Back End 260 receives fragment data from Shader Core 230 via Core Back End FIFO 290 and triangle data from Gate Keeper 220. Shader Back End 260 synchronizes the fragment and triangle data with the formatted data from Remap 250. Shader Back End 260 performs computations using the input data (formatted data, fragment data, and triangle data) based on codewords received from Remap 250. Shader Back End 260 outputs codewords and shaded fragment data.

The output of Shader Back End 260 is input to Combiners 270 where the codewords are executed by the programmable computation units within Combiners 270 that, in turn, output combined fragment data. The codewords executing in the current pass control whether the combined fragment data will be fed back within Shader 155 to be processed in a subsequent pass. Combiners 270 optionally output codewords, to be executed by Shader Core 230, to Gate Keeper 220 using feedback path 376. Combiners 270 also optionally output combined fragment data to a Quad Loop Back 256 to be used by Remap 250 in a subsequent pass. Finally, Combiners 270 optionally output combined fragment data, e.g., x, y, color, depth, other parameters, to Raster Analyzer 165. Raster Analyzer 165 performs raster operations, such as stencil, z test, etc., using the combined fragment data and fragment data stored in Local Memory 140 at the x,y location associated with the combined fragment data. The output data from Raster Analyzer 165 is written back to Local Memory 140 via Memory Controller 120 at the x,y locations associated with the output data. The output data may be written as 16 or 32 bit per pixel RGBA (red, green, blue, alpha) to be scanned out for display or used as a texture map by a shader program executed in a subsequent pass within Fragment Processing Pipeline 160 or through Graphics Processing Pipeline 105. Alternatively, color and depth data may be written, and later read and processed by Raster Analyzer 165 to generate the final pixel data prior to being scanned out for display via Output Controller 180.

To better understand embodiments of the invention, some characteristics of the Recirculating Shader Pipeline 200 will now be highlighted. One characteristic is that once a programmable computation unit has been configured by a codeword, the programmable computation unit executes the same operation on many independent pieces of data, such as fragments comprised of fragment data including color, depth, texture coordinates, etc. associated with a graphics primitive, before being reconfigured. Another characteristic is a plurality of codewords can typically be processed in the same pass through Recirculating Shader Pipeline 200 because the graphics processing units therein have a plurality of programmable computation units. Furthermore, because a configuration specified by a codeword is typically used to process many fragments and the programmable computation units must be configured prior to receiving additional fragments to be processed, it is more efficient to transport the codewords using the same means as is used to transport the fragments.

The codewords for each computation unit are combined into a single data structure, herein referred to as a PC (program counter) token, which contains a plurality of fields, wherein each programmable computation unit is associated with at least one of the fields. A codeword is scheduled for execution on a particular programmable. computation unit by placing the codeword in the field of the PC token associated with the particular programmable computation unit. The PC token also includes the PC that specifies the location of the program instruction(s) corresponding to the codewords included in the PC token. The PC can be a physical address in a graphics memory, an index to a location in a local storage resource that contains a physical memory address or an instruction, an offset from a value in a register that contains a physical memory address or an instruction, or the like. The PC token is dispatched into Recirculating Shader Pipeline 200 preceding any fragments that will be used in executing operations specified by codewords contained in the PC token. Thus, the PC token advantageously functions as an efficient means of conveying configuration information to each computation unit in Recirculating Shader Pipeline 200. Furthermore, this methodology is extensible, allowing multiple PC tokens to be in the pipeline at a given time. The PC token and the fragments used in executing operations specified by codewords in the PC token traverse the graphics processing units within Recirculating Shader Pipeline 200 in a single pass. Additional passes can be used to further process the fragment data using different codewords or the same codewords. Likewise, additional passes can be used to execute operations specified by the same codewords using different fragment data or the same fragment data. Remap 250 receives the program instructions and converts the program instructions into codewords that are placed in PC tokens.

Figure 3:
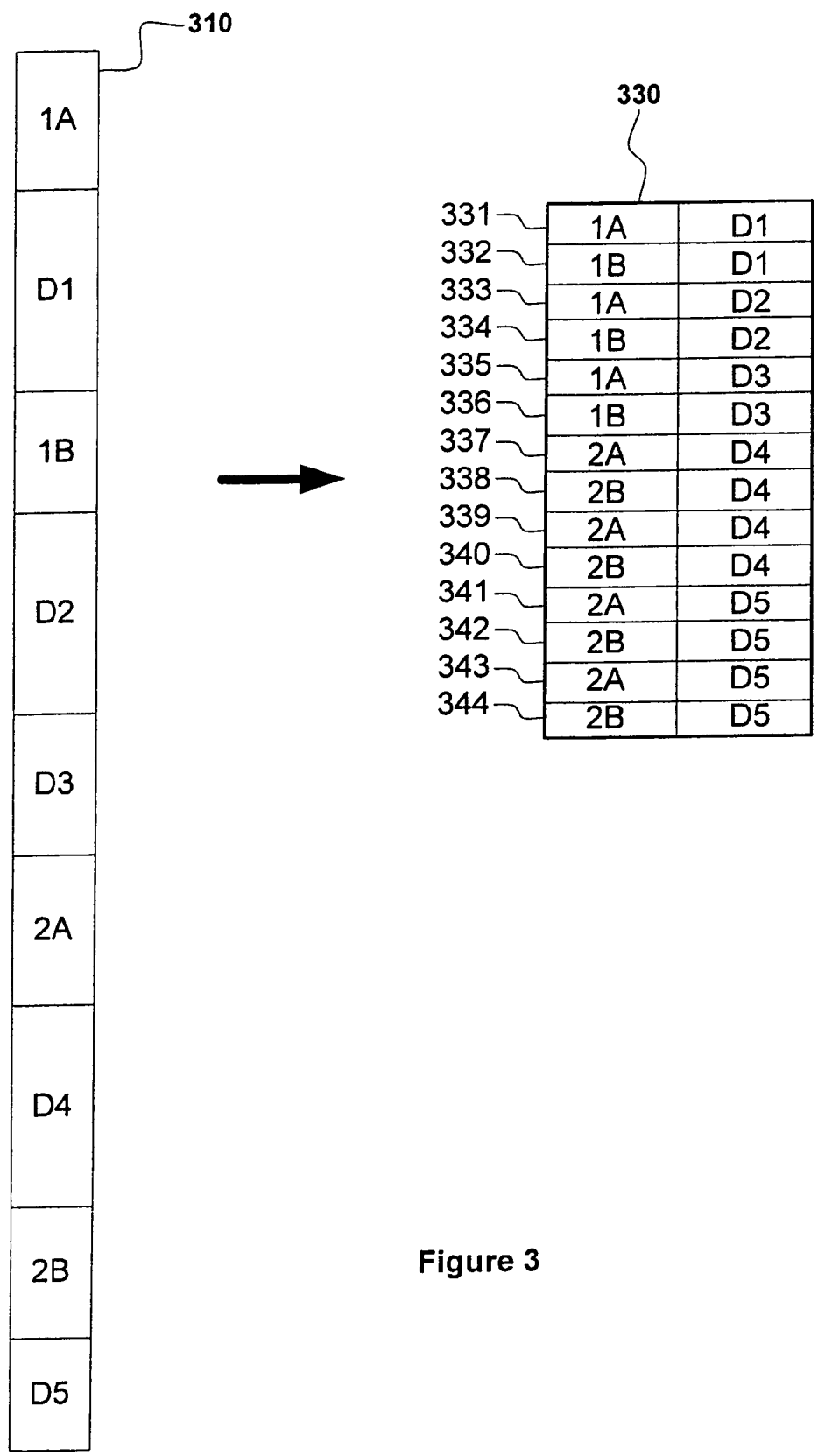
FIG. 3 is an embodiment of a method of the invention utilizing the Remap illustrated in FIG. 2.

FIG. 3 is an illustration of an input stream 310 containing program instructions and fragments received by Remap 250 and an output stream 330 containing PC tokens and fragments output by Remap 250 to be executed in Recirculating Shader Pipeline 200. The input stream 310 includes a first shader program comprised of sequences 1A and 1B and a second shader program comprised of sequences 2A and 2B. The fragments to be processed by the first shader program are fragment sets D1, D2, and D3. The fragments to be processed by the second shader program are fragment sets D4 and D5.

Remap 250 receives the input stream 310 containing program instructions and fragments, converts the program instructions into codewords which are placed in PC tokens, and outputs the output stream 330 containing PC tokens and fragments. The first column in output stream 330 contains the program instruction sequence corresponding to the codewords placed in each PC token. The second column in output stream 330 contains the selected fragment sets that are output by Remap 250 after each PC token.

In this example, Remap 250 receives and converts the program instructions in sequence 1A into codewords. Remap determines that the codewords generated to execute the program instructions in sequence 1A can be executed based on the capabilities and availability of the programmable computation units in Recirculating Shader Pipeline 200 and places those codewords in a first PC token. If Remap 250 is unable to place all of the codewords generated to execute a sequence of program instructions, the sequence is divided into two or more sequences of program instructions as further described and shown herein.

Continuing with this example, Remap 250 outputs the first PC token followed by selected fragments D1 as shown in a first row 331 of output stream 330, where D1 represents a set of fragments selected from a total number of fragments including D1, D2, and D3. The selection of fragments in a set of fragments such as fragment set D1, is determined based on the number of fragments that can be processed by Recirculating Shader Pipeline 200 in a pass that, in turn, is determined by the number of storage elements in the blocks comprising Recirculating Shader Pipeline 200. Alternatively, when the program instructions can be executed in a single pass using Shader Back End 260 and/or Combiners 270, the selection of fragments in a set is determined based on the number of fragments that can be processed by Shader Back End 260 and/or Combiners 270.

While the fragments in fragment set D1 are being processed by Recirculating Shader Pipeline 200, Remap 250 constructs a second PC token including the codewords to execute the program instructions in sequence 1B. Alternatively, Remap 250 can postpone creation of the second PC token until after fragment set D1 is processed. When the first PC token returns to Remap 250 from Combiners 270 via Gate Keeper 220, Shader Core 230, and Texture 240, Remap 250 outputs the second PC token followed by recirculating first processed fragment set D1 as shown in a second row 332 of output stream 330. While first processed fragment set D1 is being processed according to the codewords in the second PC token, Remap 250 constructs a third PC token including the codewords to execute the program instructions in sequence 1A on fragment set D2. Unlike the first pass, when the first PC token followed by the recirculating first processed fragment set D1 returned to Remap 250, in the second pass the twice processed fragment set D1 is not fed back by Combiners 270 to Remap 250, but is instead, output by Combiners 270 to Raster Analyzer 165. After outputting twice processed fragment set D1, Remap 250 outputs the third PC token followed by fragment set D2 as shown in a third row 333 of output stream 330. The selection of fragment set D2 is determined based on the number of fragments that can be processed in Recirculating Shader Pipeline 200 in a single pass. In this example, Remap 250 continues by outputting a fourth, fifth, and a sixth PC Token and fragment sets until program sequences 1A and 1B have been executed on fragment sets D1, D2, and D3 as shown in output stream 330, completing the execution of the first shader program.

Unlike the first program that did not include any loop or branch instructions, a second shader program composed of sequences 2A and 2B includes a loop instruction as the last instruction in the sequence 2B. While first processed fragment set D3 is being processed according to the codewords corresponding to sequence 1B in the sixth PC token, shown in a sixth row 336 of output stream 330, Remap 250 constructs a seventh PC token including the codewords to execute the program instructions in sequence 2A on fragment set D4, where fragment set D4 s selected from the total number of fragments including D4 and D5. After outputting fragment set D3, Remap 250 outputs the seventh PC token followed by fragment set D4 as shown in a seventh row 337 of output stream 330. The last instruction in sequence 2A is a branch instruction that includes the information needed to determine the location of the first instruction in sequence 2B. For example, the information can be a physical address in a graphics memory, e.g., Local Memory 140 and local storage resources, an index to a location in a local storage resource that contains a physical memory address or an instruction, an offset from a value in a register that contains a physical memory address or an instruction, or the like. In this example the loop and branch are separate instructions. Alternatively, the loop and branch are each accomplished using a conditional jump instruction where the loop jumps to an earlier instruction and the branch jumps to a later instruction.

Continuing with this example, if the first instruction in sequence 2B is in the graphics memory, Remap 250 is not able to convert codewords for the program instructions in sequence 2B until the program instructions in sequence 2B are received from Texture 240. When the program instructions in sequence 2B are received, Remap 250 constructs an eighth PC token including the codewords to execute the program instructions in sequence 2B on recirculating first processed fragment set D4.

When the seventh PC token recirculates back to Remap 250, Remap 250 outputs the eighth PC token followed by recirculating first processed fragment set D4 as shown in an eighth row 338 of output stream 330. While the recirculating first processed fragment set D4 is being processed according to the codewords in the eighth PC token, Remap 250 constructs a ninth PC token including the codewords to execute the program instructions in sequence 2A, and executes the last instruction, a loop instruction, in sequence 2B.

When the eighth PC token returns to Remap 250, Remap 250 outputs the ninth PC token followed by recirculating first processed fragment set D4, as shown in a ninth row 339 of output stream 330. Remap 250 continues by outputting a tenth, eleventh, twelfth, thirteenth, and a fourteenth PC Token and fragment sets until program sequences 2A and 2B have each been executed twice on fragment sets D4 and D5 as shown in the tenth through fourteenth rows 340-344 of output stream 330. In an alternate example a shader program includes multiple branch instructions and/or nested loop instructions. In an alternate embodiment of the invention Remap 250 receives at least two input streams from Texture 240, a stream of program instructions and a stream of fragments that are used to generate output stream 330.

Figure 4:
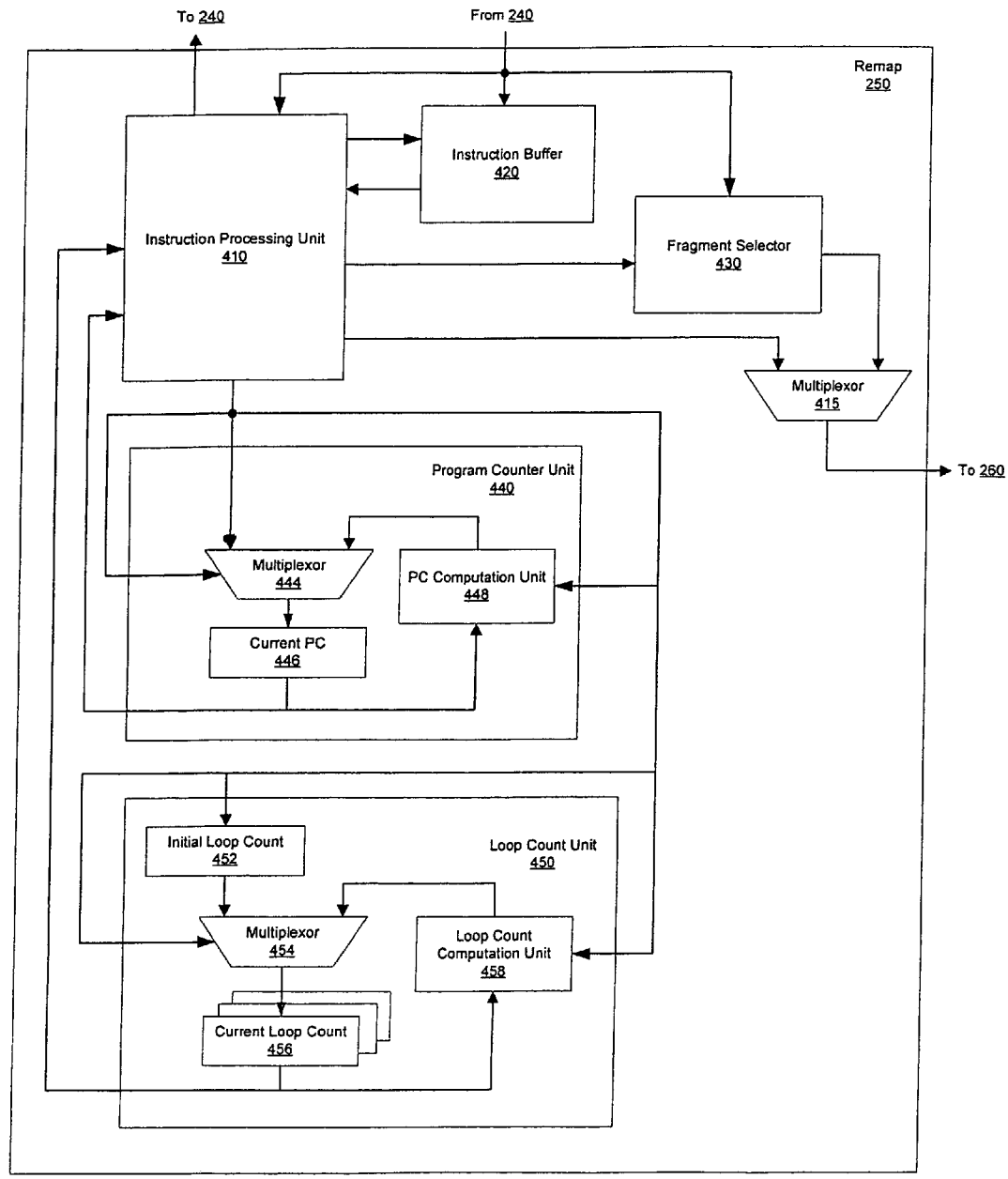
FIG. 4 is a block diagram of the units which generate the program counter and loop count in an embodiment of the Remap of FIG. 2.

FIG. 4 is an illustration of the units in Remap 250 that generate the program counter and loop count. An Instruction Processing Unit 410 receives a stream of program instructions and fragments from Texture 240. Instruction Processing Unit 410 stores program instructions in an Instruction Buffer 420 and converts the program instructions generating codewords that are placed in PC tokens. PC tokens are output in an output stream containing PC tokens and fragments to Shader Back End 260 via a Multiplexor 415. Instruction Buffer 420 is a local storage resource such as a register file, memory, cache, or the like, that stores program instructions which are read one or more times by Instruction Processing Unit 410. In an alternative embodiment, Remap 250 includes a read interface to Memory Controller 130 and reads program instructions from Local Memory 140 via Memory Controller 130. Instruction Processing Unit 410 controls a Fragment Selector 430, so that a set of fragments received from Texture 240 is selected for output to Shader Back End 260 via Multiplexor 415 based on the number of fragments that can be processed. Multiplexor 415 selects either PC tokens or fragment data for output to Shader Back End 260 under control of Instruction Processing Unit 410. When Instruction Processing Unit 410 is unable to accept fragment data or program instructions from Texture 240, signal 405 communicates that information to Texture 240. Instruction Processing Unit 410 is unable to accept fragment data or program instructions when Shader Back End 260 is processing fragment data and is unable to accept additional fragment data or program instructions.

A Program Counter Unit 440 computes the current PC based on information received from Instruction Processing Unit 410. Instruction Processing Unit 410 outputs information specifying the location, e.g., a pointer to the program instruction(s) that correspond to the codewords being placed in the PC token. For example, the information can be a physical address in a graphics memory, an index to a location in Instruction Buffer 420, an offset from a value in a storage resource, or the like. A Multiplexor 444 selects between the output of Instruction Processing Unit 410 and the output of a PC Computation Unit 448, described further herein. The output of Multiplexor 444 is stored in a storage resource, Current PC 446, such as a register file, memory, cache, or the like, and output to Instruction Processing Unit 410 and PC Computation Unit 448. PC Computation Unit 448 computes an updated PC based on information received from Instruction Processing Unit 410. For example, PC Computation Unit 448 can add an offset to the current PC to compute a PC to branch to or subtract an offset from the current PC to compute the first PC with a loop. Alternatively, the PC Computation Unit 448 can increment the current PC for each program instruction that is executed by codewords in a PC token. The PC Computation Unit 448 can also compute other arithmetic operations using inputs received from Instruction Processing Unit 410. Typically, the first PC for a shader program is received from the Instruction Processing Unit 410 by the Program Counter Unit 440 and subsequent PCs are computed by PC Computation Unit 448 under control of the Instruction Processing Unit 410.

A Loop Count Unit 450 computes the current loop count based on information received from Instruction Processing Unit 410. A storage resource, Initial Loop Count 452 is loaded by Instruction Processing Unit 410 with information specifying an initial loop count. Initial Loop Count 452 is loaded as a result of a register write program instruction or as a result of executing either a loop instruction or nested loop instruction. A Multiplexor 454 selects between the output of Initial Loop Count 452 and the output of a Loop Count Computation Unit 458, described further herein. The output of Multiplexor 454 is stored in a storage resource, Current Loop Count 456 for output to Instruction Processing Unit 410 and Loop Count Computation Unit 458. Additional Current Loop Count storage resouces are included in Loop Count Unit 450 to support the execution of nested loop instructions. These storage resources function as a stack where the first loop count pushed onto the stack is the last loop count popped off the stack. Each time a nested loop instruction is executed for the first iteration of the nested loop the value in Current Loop Count 456 is pushed onto the stack. Likewise, each time a nested loop instruction is executed for the last iteration of the nested loop, the value on the top of the stack is popped off and stored in Current Loop Count 456. Therefore, in one embodiment, the number of additional storage resources required to comprise the stack is dictated by the number of nested loop instructions that are supported. In an alternative embodiment, the additional Current Loop Count storage resources are configured as a register file that is indexed using a nesting count. The nesting count is incremented when each nested loop instruction is executed for the first iteration of the nested loop and is decremented each time a nested loop instruction is executed for the last iteration of the nested loop.

Loop Count Computation Unit 458 computes an updated loop count based on information received from Instruction Processing Unit 410. For example, Loop Count Computation Unit 458 adds an offset to the current loop count to increment or decrement the current loop count for each iteration of the loop that is executed. Alternatively, the Loop Count Computation Unit 458 can compute other arithmetic or Boolean operations under control of Instruction Processing Unit 410.

Figure 5:
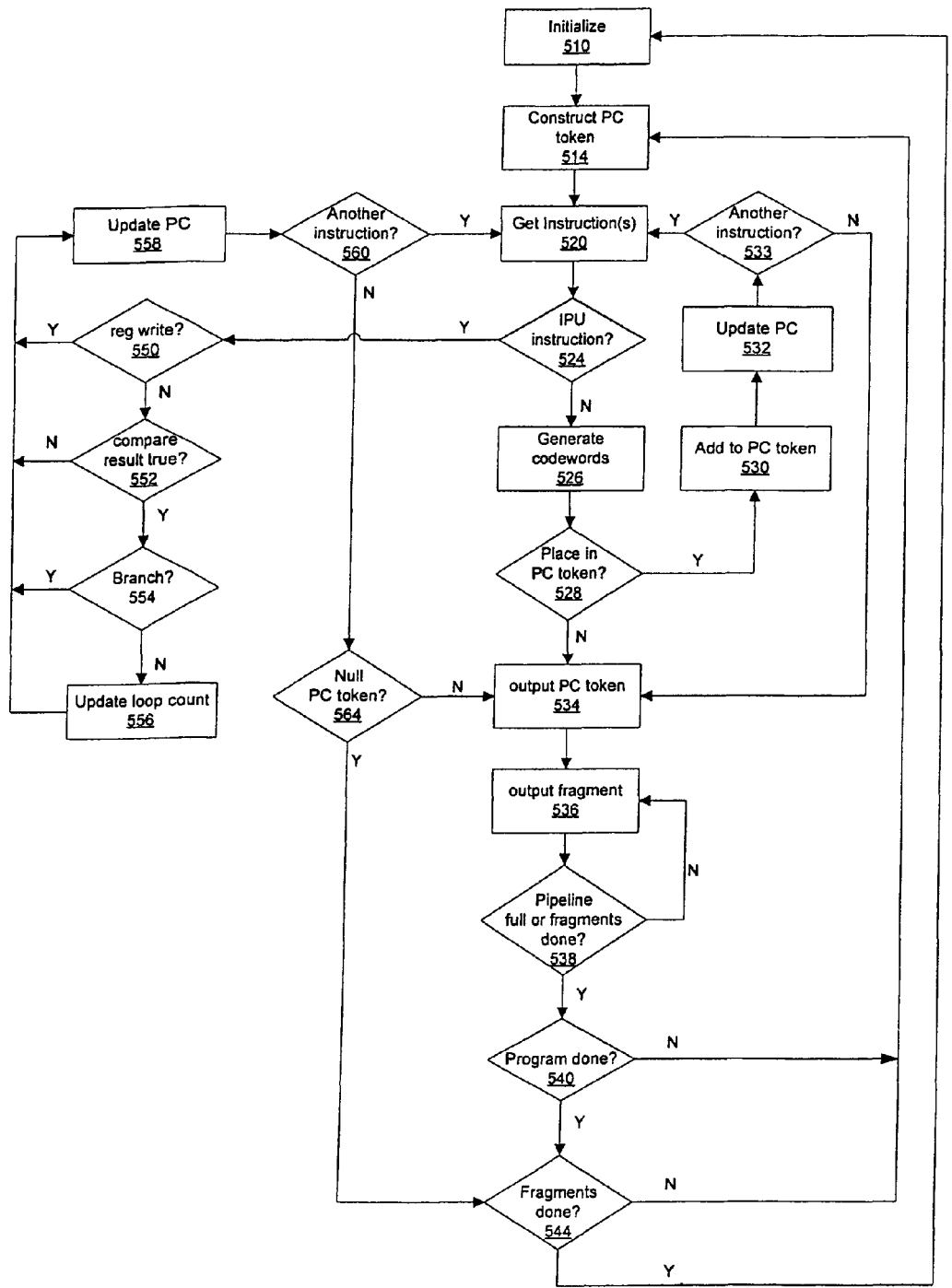
FIG. 5 is a flowchart illustrating the processing of program instructions by the units shown in FIG. 4.

FIG. 5 illustrates the processing of program instructions by the units shown in FIG. 4. In step 510, Instruction Processing Unit 410 performs initialization by loading Instruction Buffer 420, outputting an initial PC if the PC was not computed at the end of execution of the previous shader program, and optionally loading Initial Loop Count 410. In step 514, Instruction Processing Unit 410 constructs a first PC token including the PC. In step 520, Instruction Processing Unit 410 reads a first program instruction from Instruction Buffer 420. In step 524, Instruction Processing Unit 410 determines if the first program instruction is an instruction that is executed by Instruction Processing Unit 410 (IPU) without generating codewords, e.g., a local register write, a loop instruction or a branch instruction, and, if the first program instruction is not an IPU instruction, proceeds to step 526. In step 526, Instruction Processing Unit 410 generates one or more codewords to execute the first program instruction. In step 528, Instruction Processing Unit 410 determines whether the generated codewords can be placed in the first PC token, and, if so, proceeds to step 530. In step 530, Instruction Processing Unit 410 places the codeword or codewords generated to execute the first program instruction in the First PC token. In step 532, the current PC is incremented by PC Computation Unit 448 to the next program instruction. The output of PC Computation Unit 448 PC is selected by Multiplexor 444 and stored in Current PC 446. In step 533, Instruction Processing Unit 410 determines whether there is at least one more instruction in the program, and, if so, proceeds to step 520.

In step 520, Instruction Processing Unit 410 reads a second program instruction from Instruction Buffer 420. In step 524, Instruction Processing Unit 410 determines if the second program instruction is an IIPU instruction, and, if so, proceeds to step 550. In step 550, Instruction Processing Unit 410 determines if the instruction is a register write, and, if not, proceeds to step 552. In step 552, Instruction Processing Unit 410 compares two values where the comparison function was either programmed via a register write program instruction or is encoded in the program instruction, and, if the result of the comparison is false, proceeds to step 558. Examples of comparison functions include tests for equality, greater than, less than, and the like. In step 550 it is possible to use an equality comparison function to test for a calculated value being equal to a programmed value such as, alpha being equal to zero. In an alternative embodiment, the comparison performed in step 550 is performed by the Program Counter Unit 448 and the result is output to Instruction Processing Unit 410. Continuing in step 558, the current PC is incremented by PC Computation Unit 448 to the next program instruction and the output of PC Computation Unit 448 PC is selected by Multiplexor 444 and stored in Current PC 446, under control of Instruction Processing Unit 410. In step 560, Instruction Processing Unit 410 determines whether there is at least one more instruction in the program, and, if so, proceeds to step 520.

In step 520, Instruction Processing Unit 410 reads a third program instruction from Instruction Buffer 420. In step 524, Instruction Processing Unit 410 determines if the third program instruction is an IPU instruction, and, if so, proceeds to step 550. In step 550, Instruction Processing Unit 410 determines if the instruction is a register write, and, if not, proceeds to step 552. In step 552, Instruction Processing Unit 410 compares two values, and, if the result of the comparison is true, proceeds to step 554. In step 554, Instruction Processing Unit 410 determines if the third program instruction is a branch instruction, and, if so, proceeds to step 558. In step 558, the current PC is updated by PC Computation Unit 448 to the program instruction specified by the branch instruction, typically adding a value specified in the branch instruction to the current PC and the updated PC is selected by Multiplexor 444 and stored in Current PC 446. In step 560, Instruction Processing Unit 410 determines whether there is at least one more instruction in the program, and, if so, proceeds to step 520.

In step 520, Instruction Processing Unit 410 reads a fourth program instruction from Instruction Buffer 420. In step 524, Instruction Processing Unit 410 determines if the fourth program instruction is an IPU instruction, and, if the fourth program instruction is not an IPU instruction, proceeds to step 526. In step 526, Instruction Processing Unit 410 generates one or more codewords to execute the fourth program instruction. In step 528, Instruction Processing Unit 410 determines whether the generated codewords can be placed in the first PC token, and, if so, proceeds to step 530. Because the first PC token already contains the codewords generated to execute the first program instruction, the codewords generated to execute the fourth program instruction fit in the first PC token only if each of the codewords generated to execute the fourth program instruction do not need to be placed in a field already occupied by a codeword generated to execute the first program instruction. In step 530, Instruction Processing Unit 410 places the codeword or codewords generated to execute the fourth program instruction in the first PC token. In step 532, the current PC is incremented by PC Computation Unit 448 to the fifth program instruction. The output of PC Computation Unit 448 is selected by Multiplexor 444 and stored in Current PC 446. In step 533, Instruction Processing Unit 410 determines whether there is at least one more instruction in the program, and, if so, proceeds to step 520.

In step 520, Instruction Processing Unit 410 reads a fifth program instruction from Instruction Buffer 420. In step 524, Instruction Processing Unit 410 determines if the fifth program instruction is an IPU instruction, and, if so, proceeds to step 550. In step 550, Instruction Processing Unit 410 determines if the instruction is a register write, and, if so, performs the register write. In this example the fifth program instruction is register write instruction for Initial Loop Count 452 so Instruction Processing Unit 410 loads Initial Loop Count 452 with the value included in the fifth program instruction and proceeds to step 558. In step 558, the current PC is incremented by PC Computation Unit 448 to the next program instruction and the updated PC is selected by Multiplexor 444 and stored in Current PC 446. In step 560, Instruction Processing Unit 410 determines whether there is at least one more instruction in the program, and, if so, proceeds to step 520. Alternatively, Instruction Processing Unit 410 reads the fifth program instruction during the generation of the codewords to execute the fourth program instruction and completes the register write so that in step 532, the current PC is incremented by PC Computation Unit 448 to the sixth program instruction In step 520, Instruction Processing Unit 410 reads a sixth program instruction from Instruction Buffer 420. In step 524, Instruction Processing Unit 410 determines if the sixth program instruction is an IPU instruction, and, if the fifth program instruction is not an IPU instruction, proceeds to step 526. In step 526, Instruction Processing Unit 410 generates one or more codewords to execute the sixth program instruction. In step 528, Instruction Processing Unit 410 determines whether the generated codeword(s) can be placed in the first PC token, and, if not, proceeds to step 534. The program instructions that are used to generate codewords that are placed in the first PC token are a first sequence of program instructions. In this example, the first sequence includes the first through fifth program instructions. A program can be executed as a single sequence or can be divided into two or more sequences.

In step 534, Instruction Processing Unit 410 outputs the first PC token to Shader Back End 260 via Multiplexor 415. In step 536, Instruction Processing Unit 410 determines the number of fragments that can be processed by the first PC token based on the number of storage resources available in Recirculating Shader Pipeline 200 and outputs a first fragment data to Shader Back End 260 via Multiplexor 415. In another example, Instruction Processing Unit 410 determines the number of fragments that can be processed by the first PC token based on the number of storage resources available in Shader Back End 260 and Combiners 270 because the program can be executed in a single pass using those graphics processing units.

Continuing this example, in step 538, Instruction Processing Unit 410 determines whether Recirculating Shader Pipeline 200 is full, and, if not, proceeds to step 536 and outputs the next fragment data. Steps 538 and 536 are repeated, until in step 538 Instruction Processing Unit 410 determines that Recirculating Shader Pipeline 200 is full or all of the fragment data has been selected, and proceeds to step 540. The fragment data selected for processing in a pass through Recirculating Shader Pipeline 200 is a set of fragment data. Any remaining fragment data will be output to Shader Back End 260 in a set or sets of fragment data to be processed by a subsequent PC token or subsequent PC tokens. In step 540, Instruction Processing Unit 410 determines whether the program is done, and, if not, proceeds to step 514.

In step 514, Instruction Processing Unit 410 constructs a second PC token including the output of Current PC 446. In step 520, Instruction Processing Unit 410 reads the sixth program instruction from Instruction Buffer 420. The sixth program instruction is read again because the codewords generated using the sixth program instruction could not be placed in the first PC Token. In step 524, Instruction Processing Unit 410 determines if the sixth program instruction is an PU instruction, and, if the sixth program instruction is not an PU instruction, proceeds to step 526. In step 526, Instruction Processing Unit 410 generates one or more codewords using the program instruction and places the 6odeword or codewords in the second PC token. In step 528, Instruction Processing Unit 410 determines whether the generated codeword(s) can be placed in the second PC token, and, if so, proceeds to step 530. In step 530, Instruction Processing Unit 410 places the codeword or codewords generated to execute the sixth program instruction in the second PC token. In step 532, the current PC is incremented by PC Computation Unit 448 to the next program instruction and the output of PC Computation Unit 448 PC is selected by Multiplexor 444 and stored in Current PC 446. In step 533, Instruction Processing Unit 410 determines whether there is at least one more instruction in the program, and, if so, proceeds to step 520.

In step 520, Instruction Processing Unit 410 reads a seventh program instruction from Instruction Buffer 420. In step 524, Instruction Processing Unit 410 determines if the seventh program instruction is an PU instruction, and, if so, proceeds to step 550. In this example the seventh program instruction is a loop instruction and in step 550, Instruction Processing Unit 410 determines the instruction is not a register write and proceeds to step 552. In step 552, Instruction Processing Unit 410 compares two values, a constant and the initial loop count, each programmed by a previously executed program instruction. Alternatively, the constant value is included in the loop instruction or specified as part of the comparison, e.g. an equal to, greater than, or less than zero comparison. Initial Loop Count 452 was previously loaded with the initial loop count value when Instruction Processing Unit 410 executed the fifth program instruction. Alternatively, Current Loop Count 456 was previously loaded with the initial loop count value when Instruction Processing Unit 410 executed the fifth program instruction. In this example the comparison is used to determine if at least one more iteration of the loop will be executed, i.e. the number of iterations specified by the program has not been completed, and, if the result of the comparison is true, proceeds to step 554. In step 554, Instruction Processing Unit 410 determines if the seventh program instruction is a branch instruction, and, if not, proceeds to step 556 to continue execution of the loop instruction. In step 556, Loop Count Computation Unit 458 updates the current loop count, in this example, by decrementing the current loop count. Alternatively, the current loop count is updated using a program instruction that decrements the current loop count and writes Current Loop Count 456. In this example, Multiplexor 454 selects the decremented loop count output by Loop Count Computation Unit 458 and the decremented loop count is stored in Current Loop Count 456. In step 558, the current PC is incremented by the PC Computation Unit to the program instruction following the loop instruction, typically subtracting a value specified in the loop instruction from the current PC. The updated PC is selected by Multiplexor 444 and stored in Current PC 446. In this example the first (and only) instruction to be executed in the loop is the sixth instruction in the program. In step 560, Instruction Processing Unit 410 determines whether there is at least one more instruction in the program, and, if so, proceeds to step 520.

In step 520, Instruction Processing Unit 410 reads the sixth program instruction from Instruction Buffer 420. In step 524, Instruction Processing Unit 410 determines if the sixth program instruction is an IPU instruction, and, if the sixth program instruction is not an PU instruction, proceeds to step 526. In step 526, Instruction Processing Unit 410 generates one or more codewords using the program instruction and places the codeword or codewords in the second PC token. In step 528, Instruction Processing Unit 410 determines whether the generated codeword(s) can be placed in the second PC token, and, if not, proceeds to step 534. In this example, the codeword(s) cannot be placed in the second PC token because the codeword(s) for execution of the first iteration of the loop need to process the first set of fragment data before the second iteration can be executed.

In step 534, Instruction Processing Unit 410 outputs the second PC token to Shader Back End 260 via Multiplexor 415. In step 536, Instruction Processing Unit 410 waits for the fragments processed by the first sequence of program instructions to recirculate to Remap 250 if the processed fragments are not already available. The processed fragments are output to Shader Back End 260 via Multiplexor 415 by repeating steps 538 and 536 until all of the processed fragments are output and then Instruction Processing Unit proceeds to step 540. In step 540, Instruction Processing Unit 410 determines whether the program is done, and, if not, proceeds to step 514.

In step 514, Instruction Processing Unit 410 constructs a third PC token including the output of Current PC 446. In step 520, Instruction Processing Unit 410 reads the sixth program instruction from Instruction Buffer 420 to execute the second iteration of the loop. In step 524, Instruction Processing Unit 410 determines if the sixth program instruction is an PU instruction, and, if the sixth program instruction is not an PU instruction, proceeds to step 526. In step 526, Instruction Processing Unit 410 generates one or more codewords using the program instruction and places the codeword or codewords in the third PC token. In step 528, Instruction Processing Unit 410 determines whether the generated codeword(s) can be placed in the third PC token, and, if so, proceeds to step 530. In step 530, Instruction Processing Unit 410 places the codeword or codewords generated to execute the sixth program instruction in the third PC token. In step 532, the current PC is incremented by PC Computation Unit 448 to the next program instruction. The output of PC Computation Unit 448 is selected by Multiplexor 444 and stored in Current PC 446. In step 533, Instruction Processing Unit 410 determines whether there is at least one more instruction in the program, and, if so, proceeds to step 520.

In step 520, Instruction Processing Unit 410 reads the next instruction, i.e. the seventh program instruction, from Instruction Buffer 420. In step 524, Instruction Processing Unit 410 determines if the seventh program instruction is an PU instruction, and, if so, proceeds to step 550. In step 550, Instruction Processing Unit 410 determines if the instruction is a register write, and, if it is not, proceeds to step 552. In step 552, Instruction Processing Unit 410 compares two values, a constant and the current loop count output by Loop Count Unit 450. In this example the comparison is used to determine if at least one more iteration of the loop will be executed, i.e. the number of iterations specified by the program has not been completed, and, if the result of the comparison is false, Instruction Processing Unit 410 proceeds to step 558. In step 558, the current PC is incremented by PC Computation Unit 448 to a seventh program instruction that is the first instruction for an other program. The output of PC Computation Unit 448 PC is selected by Multiplexor 444 and stored in Current PC 446. In step 560, Instruction Processing Unit 410 determines whether there is at least one more instruction in the program, and, if not, proceeds to step 564. In step 564, Instruction Processing Unit 410 determines whether the third PC token contains any codewords, and, if so, proceeds to step 534. In step 534, Instruction Processing Unit 410 outputs the third PC token to Shader Back End 260 via Multiplexor 415 and proceeds to step 536. In step 536, Instruction Processing Unit 410 waits for the fragments processed by the second sequence of program instructions to recirculate to Remap 250 if the processed fragments are not already available. The processed fragments are output to Shader Back End 260 via Multiplexor 415 by repeating steps 538 and 536 until all of the processed fragments are output and then Instruction Processing Unit proceeds to step 540. In step 540, Instruction Processing Unit 410 determines whether the program is done, and, if so, proceeds to step 544. In step 544, Instruction Processing Unit 410 determines whether there is at least one more fragment to be processed by the program, and, if so, proceeds to step 514.

These steps are repeated to execute each of the six program instructions on any remaining sets of fragment data. Finally, in step 544 Instruction Processing Unit 410 determines whether there is at least one more fragment to be processed by the program, and, if not, proceeds to step 510 to begin the execution of an other program.

In an alternative embodiment the loop count is output in the PC token. Graphics processing units receiving the loop count in a PC token use the loop count value as an index to access storage resources such as register files, graphics memory, cache, or the like. For example, a graphics processing unit computing per light fragment color computes a color based on one of several light sources during each iteration of a loop. In this example, the received loop count is used as an index to read the parameters associated with each light source. Furthermore, graphics processing units receiving the loop count in a PC token optionally store the loop count locally using the loop count as an index or to process fragment data. In yet another embodiment the loop count is output with each fragment.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", etc.) does not indicate any specific order for carrying out steps or other operations; the lettering is included to simplify referring to those elements.

The invention claimed is:

1. A programmable multipass shader, comprising:
   a remap unit including:
   an instruction processing unit configured to receive program instructions, convert the program instructions into codewords, and place the codewords in a program counter token, wherein the shader program instructions include a loop instruction, and the loop instruction is not converted into a codeword and is not placed in a program counter token,
   a fragment selector configured to select a first number of fragments under control of the instruction processing unit from a total number of fragments to produce a fragment set, wherein the first number of fragments is based on a number of storage elements included in a recirculating shader pipeline, a multiplexor configured to output the fragment set and a first program counter token that includes codewords corresponding to a first set of program instructions, a program counter unit configured to compute and output a current program counter (PC) under control of the instruction processing unit, wherein the current PC is included in the first program counter token and the current PC specifies a location of the program instructions corresponding to the codewords included in the first program counter token, and a loop count unit configured to compute and output a current loop count under control of the instruction processing unit; and a shader core unit, a shader back end unit, and a combiner unit, each including at least one programmable computation unit configured by the codewords included in the first program counter token to perform arithmetic operations on the fragment set, wherein the first program counter token includes a plurality of fields, wherein each programmable computation unit is associated with at least one of the fields included in the first program counter token, and wherein a first codeword corresponding to a first program instruction is placed in the first program counter token only when the first codeword can be placed into a field not already occupied by a second codeword corresponding to a second program instruction.

2. The programmable multipass shader of claim 1, wherein the shader program instructions include a branch instruction, wherein the branch instruction is not converted into a codeword and is not placed in a program counter token.

3. The programmable multipass shader of claim 1, wherein the combiner unit determines whether to feed back the fragment set to be processed in a subsequent pass based on the codewords included in the first program counter token.

4. The programmable multipass shader of claim 1, wherein once one of the programmable computation units is configured by a codeword, the same operation is performed by the programmable computation unit on a plurality of fragments in the fragment set.

5. The programmable shader of claim 1, wherein the program counter unit comprises:
a current program counter storage resource configured to output the current PC;
a program counter computation unit configured to receive the current PC and calculate a computed PC; and
a selector configured to select, between a value output by the instruction processing unit and the computed PC, an input to the current program counter storage resource.

6. The programmable shader of claim 5, wherein the program counter computation unit is further configured to calculate the computed PC using an arithmetic function.

7. The programmable shader of claim 1, wherein the loop count unit comprises:
a current loop count storage resource configured to output the current loop count;
a loop count computation unit configured to receive the current loop count and calculate a computed loop count; and
a selector configured to select, between a value output by the instruction processing unit and the computed loop count, an input to the current loop count storage resource.

8. The programmable shader of claim 7, wherein the loop count unit further comprises additional current loop count storage resources configured to store the current loop count prior to executing each nested loop program instruction.

9. The programmable shader of claim 8, wherein the additional current loop count storage resources are accessed using a nesting count.

10. A method for executing a shader program in a programmable multipass shader, the method comprising:
selecting a sequence of instructions from the shader program;
converting the sequence of instructions into codewords;
placing the codewords into a program counter token based on available resources in the programmable multipass shader, including available programmable computation units, wherein the sequence of instructions includes a loop instruction that is not converted into a codeword and is not placed in a program counter token;
selecting a first number of fragments under control of an instruction processing unit from a total number of fragments to produce a fragment set, wherein the first number of fragments is based on a number of storage elements included in a recirculating fragment processing pipeline;
outputting the fragment set and a first program counter token that includes codewords corresponding to a first set of program instructions;
computing and outputting a current program counter (PC) that is included in the first program counter token and the current PC specifies a location of the program instructions corresponding to the codewords included in the first program counter token;
configuring the programmable multipass shader which includes a shader core unit, a shader back end unit, and a combiner unit, each including at least one of the programmable computation units configured by the codewords included in the program counter token to perform arithmetic operations on the fragment set; and
storing the results of performing the arithmetic operations in a memory,
wherein the program counter token includes a plurality of fields, wherein each programmable computation unit is associated with at least one of the fields included in the program counter token, and
wherein a first codeword corresponding to a first program instruction is placed in the program counter token only when the first codeword can be placed into a field not already occupied by a second codeword corresponding to a second program instruction.

11. The method of claim 10, wherein the sequence of instructions includes a branch instruction, wherein the branch instruction is not converted into a codeword and is not placed in a program counter token.

12. The method of claim 10, further comprising combining the program counter token with the fragment set to produce an output stream.

13. The method of claim 10, further comprising:
determining the sequence of instructions includes a branch instruction; and
executing the branch instruction by updating a program counter.

14. The method of claim 10, further comprising determining whether to feed back the fragment set to be processed in a subsequent pass based on the codewords included in the first program counter token.

15. The method of claim 10, wherein once one of the programmable computation units is configured by a codeword, the same operation is performed by the programmable computation unit on a plurality of fragments in the fragment set.

16. The programmable shader of claim 1, wherein the loop count unit comprises an initial loop count storage resource configured to output an initial loop count, loaded under control of the instruction processing unit.

17. The programmable shader of claim 1, further comprising one or more storage resources addressable using the current loop count.

* * * * *